United States Patent [19]

Eiriksson

[11] 4,290,386
[45] Sep. 22, 1981

[54] DOG SANITARY DEVICE

[76] Inventor: Richard Eiriksson, 4352 Verdugo Rd., Los Angeles, Calif. 90067

[21] Appl. No.: 75,949

[22] Filed: Sep. 17, 1979

[51] Int. Cl.³ ............................................. A01K 23/00
[52] U.S. Cl. ...................................................... 119/95
[58] Field of Search .................................. 119/95, 143

[56] References Cited

U.S. PATENT DOCUMENTS

| | | | |
|---|---|---|---|
| 881,753 | 3/1908 | Whitehouse | 119/95 |
| 2,141,970 | 12/1938 | Buckingham | 119/143 |
| 3,211,132 | 10/1965 | Hersh | 119/143 |
| 3,850,159 | 11/1974 | Langley | 119/95 |
| 3,875,903 | 4/1975 | Sarvary | 119/95 |
| 4,095,562 | 6/1978 | Graham | 119/95 |

Primary Examiner—Jay N. Eskovitz

[57] ABSTRACT

An improved dog sanitary device for a type including a harness securable about the dog's torso, and a removable receptacle for collection and disposal of bodily waste products is provided comprising a harness carried frame and a bag collector assembly, the assembly frame comprising a wire member generally U-shaped in horizontal section and crescent shaped in vertical section openly underlying the dog excretory orifices in close proximity to the dog's body, and the bag comprising precut sheet material foldable over the frame in dog body engaging and receptacle defining relation, and fasteners securing the sheet material in place for use. A sanitary napkin is contained with an elongated pad covering securable to the underside of the harness. A rear cover secured to the rear of the harness to obscure the apparatus from the rear. Both the rear cover and pad carrier are preferably fur covered matching the appearance of the dog's coat.

3 Claims, 12 Drawing Figures

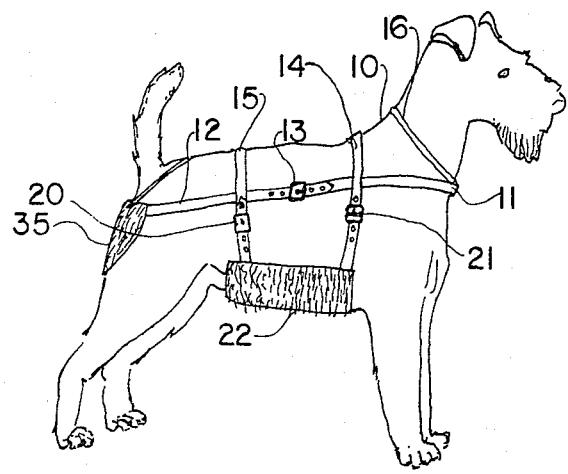
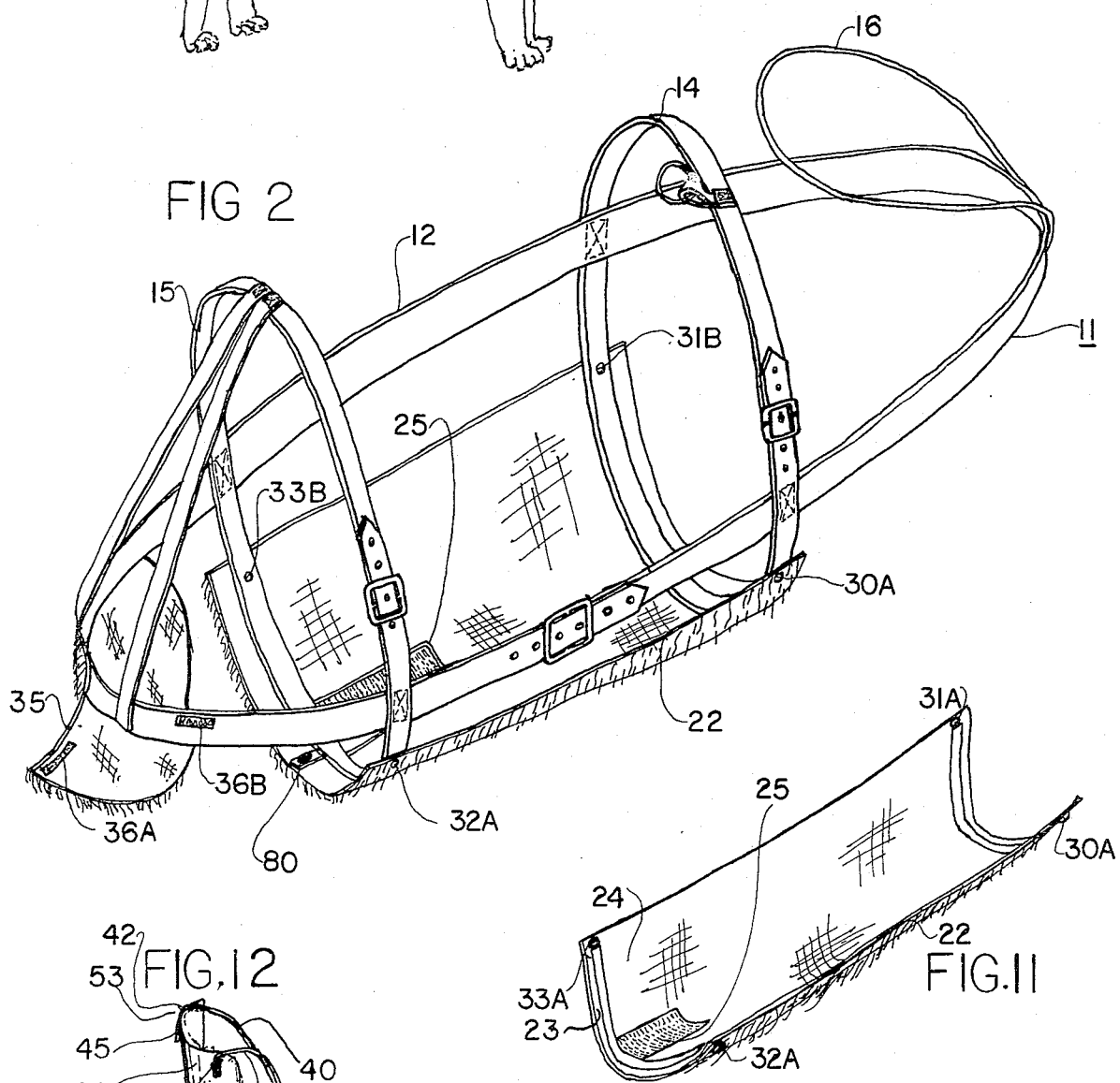
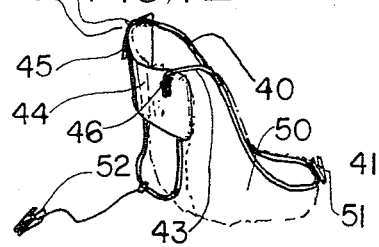
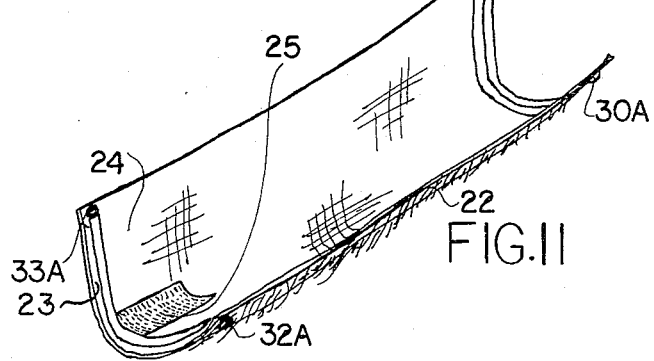

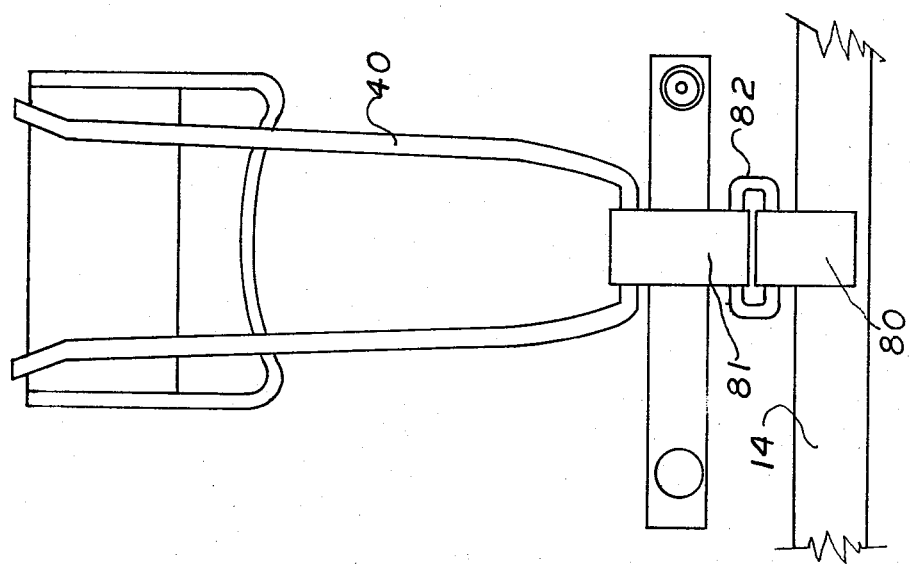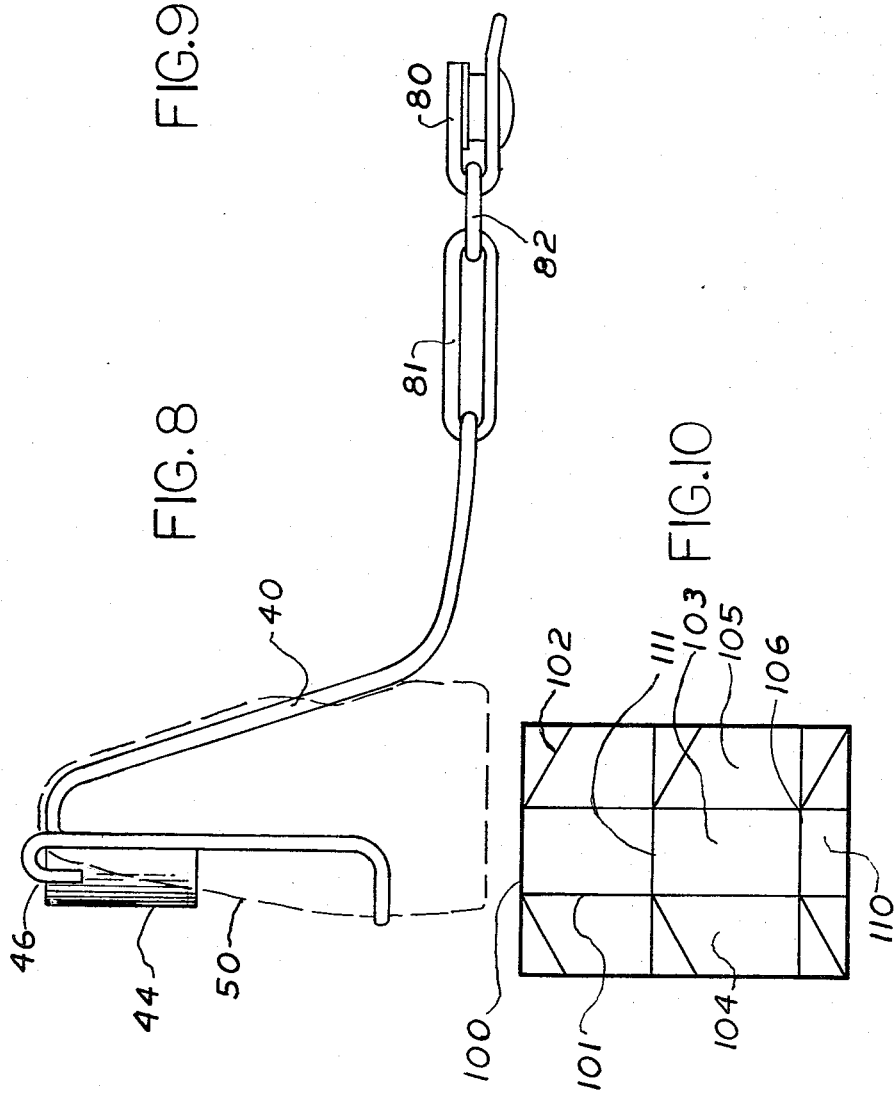

DOG SANITARY DEVICE

BACKGROUND OF THE INVENTION

This invention has to do with dog sanitary devices and more particularly is concerned with improvements in such devices enabling more asthenthic, more practical, and more efficient application and utilization of such devices.

PRIOR ART

Numerous bag-like expedients have been devised for application to dogs and other domestic and farm animals in order to catch their excretions be they menstrual, urinary or fecal. In general, increasing environmental controls in urban areas are cited as the cause for development of animal excretion capturing devices.

These devices in the prior art generally may be divided into those employing a flaccid bag which is mounted to the animal in critical juxta position to the orifice to be controlled and those in which a more substantial pre-formed appliance is attached to the dog or like animal for collection purposes. The former suffer the disadvantage of unattractive, indeed comical appearance, while the latter suffer from undue expense in the substantiality required in the appliances employed. In the preparation of the present application, the following references have been considered:

| | | |
|---|---|---|
| 229,321 | | Francis |
| 337,181 | March 2, 1886 | McDonough |
| 2,173,356 | January 3, 1939 | Cross |
| 2,190,115 | April 19, 1938 | Fuqua |
| 3,211,132 | January 3, 1964 | Hersh |
| 3,090,356 | May 21, 1963 | Andrisani |
| 3,176,657 | April 6, 1963 | Callaway |
| 3,656,459 | April 18, 1972 | Missud |
| 3,738,330 | June 12, 1973 | Alofsin |
| 3,786,787 | January 22, 1974 | Weinberger |
| 3,792,687 | February 19, 1974 | Ehrman |
| 3,817,217 | June 18, 1974 | Matuka et al |
| 3,850,159 | November 26, 1974 | Langley |
| 3,875,903 | April 8, 1975 | Sarvary |
| 4,095,562 | June 20, 1978 | Graham |
| 4,103,645 | August 1, 1978 | Tyler |

SUMMARY OF THE INVENTION

It is accordingly an object of the present invention to provide an improved dog sanitary device. It is more particularly an object to provide a dog sanitary device having the convenience of throwaway receptacle for excreted matter combined with the desired rigidity in place heretofore afforded by pre-formed appliances of substantially greater cost. More specifically it is an object of the present invention to provide a readily sterilizable wire member contour to closely fit the dog's body in the critical regions useful with a disposable replaceable bag which while inherently flaccid is nonetheless maintained in shape against flaccid dangling by virtue of careful overfitting onto the wire frame. Other objects will be apparent hereinafter.

Accordingly then, the invention provides in a dog sanitary device of the type including a harness securable about the dog's torso, and a removable receptacle for collection and disposal of bodily waste products, the improvement comprising a harness carried frame and bag collector assembly, the assembly frame comprising a wire member generally U-shaped in horizontal section and crescent shaped in vertical section openly underlying the dog excretory orifices in close proximity to the dog's body, and the bag comprising precut sheet material foldable over the frame in dog body engaging and receptacle defining relation, and fasteners securing the sheet material in place for use.

The mentioned device typically employs a harness comprising a cage-like arrangement of straps encircling the dog in front and rear vertical planes and in a single horizontal plane, the horizontal strap separably engaging the wire frame in supporting relation. The harness may further include auxilliary strapping running over the dog's shoulders and haunches from the front and rear vertical straps respectively.

The bag of the present dog sanitary device typically comprises a rectangular bottom panel, and opposed side and end panels, the side and end panels having continuations adapted to fold over their respective panels about the wire frame for fastener retention there in receptacle defining relation.

In certain embodiments there may be provided liquid absorbing padding on the inside bottom panel of the bag for capture of urinary or menstrual fluids. The wire frame in preferred embodiments includes a pair of reversed frame legs abutting the dog's hind quarters in the crescent shaped portion of the wire frame, and metal plate means provided secured to the frame legs in wire frame stiffening relation.

In such embodiments as the last mentioned, the invention contemplates front and rear auxilliary strapping running over the dog's shoulders and haunches from the front and rear straps respectively, the rear strapping carrying temporary fastening means, and a decorative shield sized to block rear view of the sanitary device, is provided, the shield including means cooperating with the strapping fastening means for securement behind the dog in device view blocking relation.

In a highly particularly preferred embodiment, the invention provides in a dog sanitary device of the type including a harness securable about a dog's torso, and a removable receptacle for collection and disposal of bodily waste products, the improvement comprising a harness carried bag and frame collector assembly comprising a length of stiff wire reversely turned upon itself into generally a U-shape, a terminal portion of each U leg being further bent 90° to the remainder of the leg, stiffening means fixed between the leg terminal portions in a manner adapting the wire member to fit between a dog's legs with the bend in the U forward of the dog's urinary orifice and the stiffener adjacently beyond the dog's anal orifice; and a plastic sheet material wrapped upon and secured to the frame in receptacle defining relation below said orifices.

BRIEF DESCRIPTION OF THE DRAWINGS

The invention will be further described in an illustrative embodiment thereof in conjunction with the attached drawings in which:

FIG. 1 is a side view of a dog wearing this invention;

FIG. 2 is a perspective view of the harness;

FIG. 8 is a side elevational view of a female basket feces collector frame of this invention;

FIG. 9 is an elevated front view of the frame of FIG. 8;

FIG. 10 is a top view of a suitable blank for feces collector receptacles according to this invention;

FIG. 11 is a perspective view of the sanitary napkins holder of this invention; and FIG. 12 is a perspective view of the male feces collector.

DETAILED DESCRIPTION OF THE INVENTION

Figure 4:
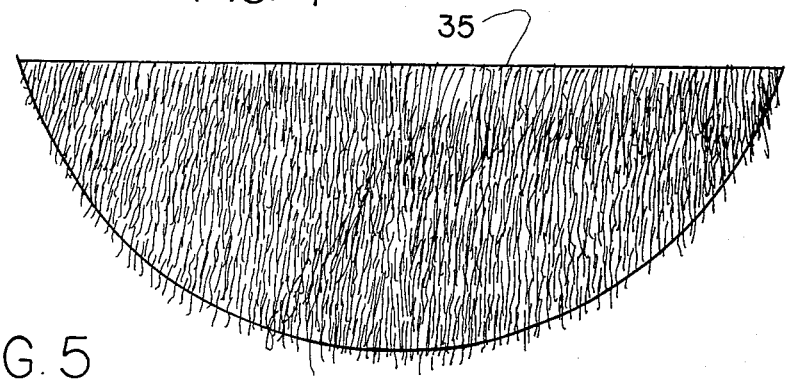
FIG. 4 is a rear view of the rear cover of this invention.
Figure 5:
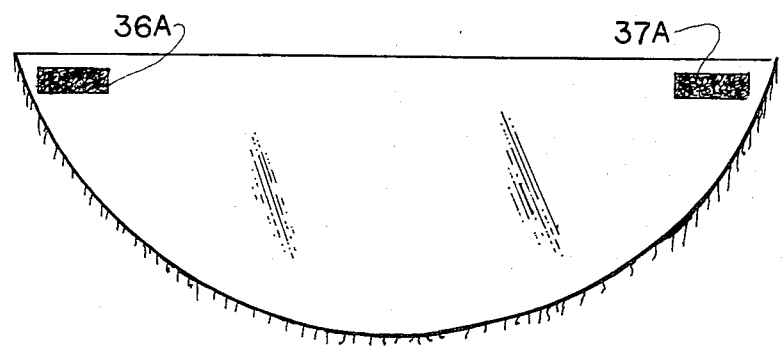
FIG. 5 is a front view thereof.
Figure 3:
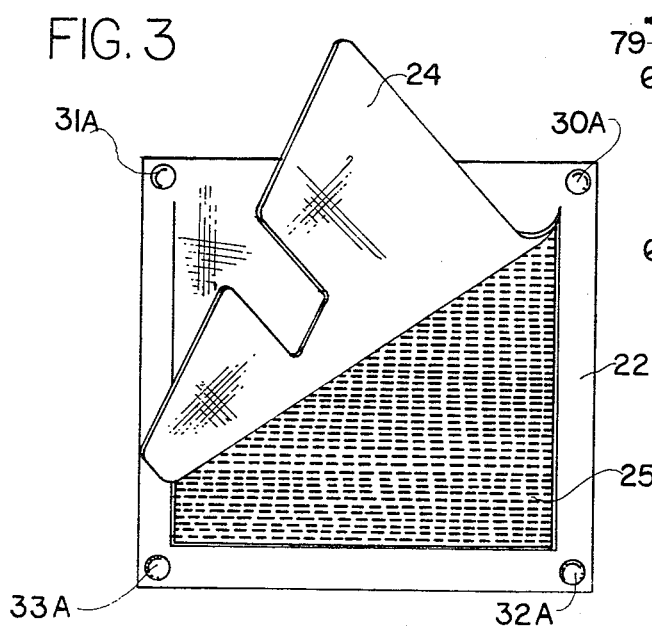
FIG. 3 is a top view of the sanitary napkin holder of this invention.

Now referring specifically to drawing FIGS. 1 and 2 for a clear understanding of this invention which is seen in FIG. 1 installed on a dog 10 comprising a body harness generally designated 11 including a main body band 12 encircles from the chest to the haunches of the dog 10 with suitable fastener such as buckle 13 located at a convenient place. Two body encircling bands 14 and 15 as well as a neck encircling band 16 provide a solid attachment base for the collecting apparatus of this invention. The harness 11 is preferrably made of leather and is of the appropriate size for the particular dog on which it is to be worn. Buckle 13 as well as similar buckle 20 and buckle 21 on bands 14 and 15 allow adjustability of the harness for comfort of the dog. Like any collar or harness the dog must become accustomed to its wearing and thereafter is not bothered by the same. Secured to the belly of the dog is a urine collecting receptacle which comprises a flexible under-cover having preferably exterior surfaces fur covered and even in a color consistent with the dog to minimize the appearance of wearing the apparatus of this invention. The receptacle 22 best seen in FIG. 2 comprises the outer fur covered main body having a first layer 23 of plastic or liquid impervious material on its inner face an inner layer 24 preferably of your impervious material. The inner cover 24 is secured as by stitching at the front of the harness with its rear end free to be folded back for insertion and removal of an absorbent napkin 25. The inner cover 24 is notched particularly for use with male dogs. The receptacle 22 is secured to the bands 14 and 15 of the harness by fastening means such as snap fasteners 30 through 33 with the fastener portions secured to the receptacle 24 given the Suffix A and their mating fastener part, Suffix B. The rear of the harness 11 includes a rear cover 35 preferably fur covered as well. This fur cover is secured to the rear portion of the body band 12 by fastening means such as the hook and loop type material such as known under the Trademark VELCRO or its equivalent. One of the mating halves of the fastening fabric is secured to the inner side of the rear cover 35 while the matching half 36B is secured to the outer surface of the band 12. The cover may be totally removed if desired, but its presence on the rear covers the fecal collection apparatus which in itself is unsightly and which has in the past constituted a serious limitation on collection apparatus.

The actual fecal apparatus is hardly visible in FIG. 1 but one form thereof may be seen in FIG. 12. It comprises a formed wire element 40 forming a front loop 41 and includes a pair of bend end regions 42 and 43 which are secured to a rear plate 44. A pair of short hook members 45 and 46 are designed to engage the upper edge of the rear of strap 12 of FIG. 2. The plate 44 and hooks 45 and 46 tend to provide a stable base for the wire form 40 to the rear and beneath the anal region of the dog. A disposable plastic bag 50 is secured to the wire frame 40 at the front by fastening means 51 and at the rear by additional fastening means 52 and 53. These fastening means may be alligator type clips special clips of a clothespin style or for that matter may on occasion be used. The plastic bag may be either transparent or opaque but given broad support over the broad range of the frame 40 has relatively little local stress and thus can easily support the dog droppings until removed and replaced. Where the plastic bag 50 is transparent the dog's master may visually determine at a distance that the dog is in need of a change of plastic bag.

The changing of the apparatus from this invention is easily accomplished merely in the case of the urine receptacle 22 of unsnapping the receptacle totally from the animal or from the one side, folding the inner flap 24 ahead allowing the used napkin to fall out and replace the napkin with a fresh one and resnapping the receptacle 22 to the bands 14 and 15.

Removal of the fecal collector is accomplished merely by unsnapping one side of the protective shield lifting the hooks 45 and 46 upward slightly to disengage them from the band 12, dropping the entire receptacle away from the dog, disengaging fastening means and disposing of the plastic bag. The plastic bag is replaced and the procedure reversed for the dog. Continuous wearing of the apparatus is probably neither necessary nor desired but it is configured to provide minimum discomfort for the dog and minimum asthetic and operational disagreeableness for the dog's master. Periodically the receptacle assemblies 22 and 40 as well as the rear cover 35 may be washed. Lack of discomfort to the dog is minimized in the case of the receptacle 22 by reason of the fact that the two bands 14 and 15 hold the receptacle 22 away from the belly and felt-like bands 37 & 38 are located on the inner surface front and rear to provide spacing and allow airflow between the receptacle 22 and the dog's skin. In the case of the receptacle 40, it is supported nearly entirely away front contact with the dog's body by the body harness 11. Strenuous activity of the dog may be accomplished within limits without disturbing the apparatus.

In addition to the use of the flexible disposable plastic bag, I have found that it is possible to devise a semi-permanent type of receptacle which cooperates with a disposable paper liner for fecal collection as well as urine collection as shown in FIGS. 1 and 2. This alternate form of fecal collector appears in FIGS. 6 and 7.

Figure 6:
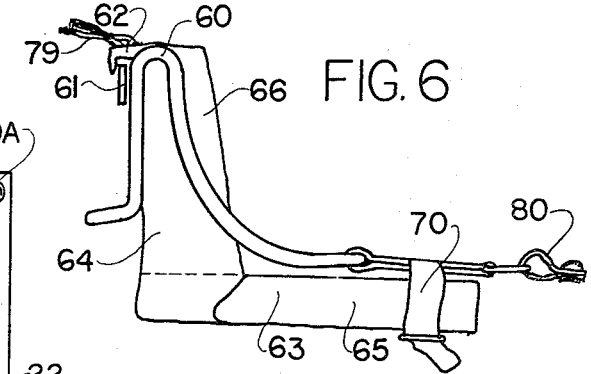
FIG. 6 is a side elevational view of the wire support and waste matter collection receptacle of this invention.
Figure 7:
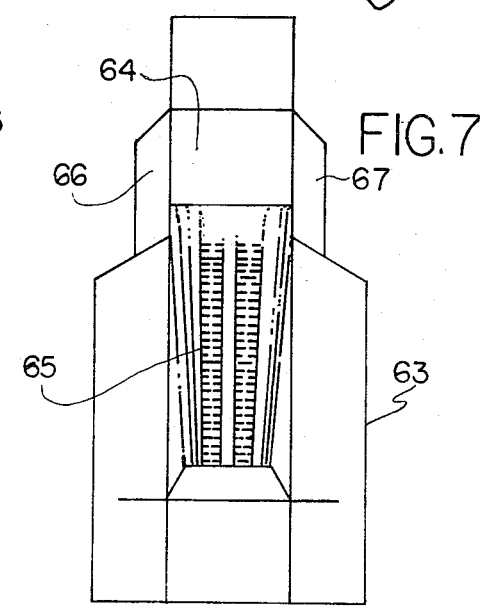
FIG. 7 is a top view of a feces collector of this invention.

Now referring specifically to FIGS. 6 and 7 a wire form 60 including a back plate 61 and a pair of hooks one of which 62 appears in the drawing and carries a semi-rigid formed water impervious box 63 including an upstanding portion 64 and a horizontal portion 65. The upstanding portion 64 rests between the legs of the wire form 60 includes a pair of outward flaring wings 66 and 67 as seen in FIG. 7. The horizontal portion 65 of the box is secured to the underside of the wire form 60 as suitable fastening means such as encircling strap and buckle 70. In the form shown in FIGS. 6 and 7 the front of the wire form includes an open space suitable for engagement with the strap 80 shown at the rear of the band 15 in FIG. 2 and unused in the male versions. The receptacle 63 is preferably made of plastic material being relatively rigid having fold lines corresponding to the folds shown in FIGS. 6 and 7. The receptacle 63 defines a box into which a paper napkin may be folded into place. As much or as little absorbent material may be placed in the box 63 depending upon the demonstrated need of the animal. The embodiment of FIGS. 6 and 7 is particularly designed for the female dog.

Where the box 63 is of inexpensive material such as poly film it may be disposed with its internal napkin. The replacement container is attached to the frame 60 by the strap 70 at the front and suitable clip 79 at the rear.

It should be noted that the body encircling band 12, the plate 44 and hooks 45 and 46 cooperate to hold the feces collecting securely on the animal with the bag 50 held closely against the animals anal region. Plate 44 provides stability.

Referring to FIGS. 8 and 9 in which the cooperation between the framework or basket cooperate with the napkin holder. I have found that it is preferable to provide two different versions of the apparatus one for male and one for female dogs. FIGS. 8 and 9 show the female version in contrast with FIGS. 1 and 2 which show the male version.

In FIG. 8 the U-shaped wire frame 40 does not include the clip or fastener 50 but instead includes an elongated strap 80 which carry a ring 82. The ring 82 is securable by strap 80 secured to the harness 11 at the bottom of strap 14. The strap 80 secures the front end of receptacle 40 to the harness which in turn supports the sanitary napkin 25. An encircling strap 8 which extends transverse to the length of the dog holds the receptacle 50 together in an elongated open top bundle. By way of contrast, in the male version, the frame 40 is cantilevered at its forward end to minimize contact and discomfort for the male dog.

FIG. 10 shows one form of blank 100 of the semi-permanent fecal receptacle of FIG. 1. It is preferably a fully flexible rectangular sheet of plastic or may be formed of sheet plastic material with integral hinges formed by thinner sections at each of the fold lines noted by describing in the drawing. A suitable material is polyethylene. It is impervious to the waste products of the animal and may either be disposed of with its absorbent paper liner and replaced or may be rinsed off and returned to service. The blank 100 includes a pair of longitudinal fold lines 101 and 102 which define the bottom 103 and two sides 104 and 105. A first transverse fold line 106 defines the front 110 of the box when folded. A second transverse fold line III defines a rear elevated box portion.

From the foregoing, it may be seen that I have produced a dog sanitary system which (1) is securely attached to the dog via a full body harness;

(2) conceals virtually all collection apparatus from view;

(3) employs low cost disposable plastic bags for fecal waste collection;

(4) employs low cost disposable paper napkins or towels or the like for urine collection;

(5) protects the animal from contact with collected urine and feces; and (6) may use flea powder treated napkins to provide continuous flea protection for the animal.

It is believed that I have produced the first truly integrated waste collection system which is effective, practical and not offensive either the animal, his master, or to others.

The above described embodiments of this invention are merely descriptive of its principles and are not to be considered limiting. The scope of this invention instead shall be determined from the scope of the following claims, including their equivalents.

I claim:

1. In a dog sanitary device of the type including a harness securable about the dog's torso, and a removable receptacle for collection and disposal of bodily waste products, the improvement comprising a harness carried frame and bag collector assembly, said assembly frame comprising a wire member generally U-shaped in horizontal section to extend forward beyond the dog's urinary opening and crescent shaped in vertical section extending upwardly to the dog's anal opening thereby openly encompassing the dog excretory orifices in close proximity to the dog's body, said removable receptacle comprising precut sheet material foldable over the frame in dog body engaging and receptacle defining relation for both the urinary and anal orifices and fasteners securing the sheet material in place for use.

2. Dog sanitary device according to claim 1, in which said bag comprises a rectangular bottom panel, and opposed side and end panels, said side and end panels having continuations adapted to fold over their respective panels about said wire frame for fastener retention there in receptacle defining relation; one of said end panels defining an upstanding portion extending upward to the rear of the dog's anal region for collecting feces while said side panels define an enclosure for liquid absorbing padding.

3. Dog sanitary device according to claim 1, including also front and rear auxiliary strapping running over the dog's shoulders and haunches from said front and rear straps respectively, said rear strapping carrying temporary fastening means, and a decorative fur covered shield sized to block rear view of the sanitary device, said shield including means cooperating with said strapping fastening means for securement behind said dog in device view blocking relation.

* * * * *